(12) United States Patent
Sung et al.

(10) Patent No.: US 7,668,122 B2
(45) Date of Patent: Feb. 23, 2010

(54) COMMUNICATION APPARATUS USING A TRANSMISSION MEDIUM AND METHOD FOR THE SAME

(75) Inventors: Jin Bong Sung, Seocheon (KR); Sung Weon Kang, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 617 days.

(21) Appl. No.: 11/088,977

(22) Filed: Mar. 24, 2005

(65) Prior Publication Data

US 2006/0092908 A1    May 4, 2006

(30) Foreign Application Priority Data

Oct. 7, 2004    (KR) ...................... 10-2004-0079761

(51) Int. Cl.
   *H04B 3/20*   (2006.01)
(52) U.S. Cl. ........................ 370/280; 370/282; 370/286
(58) Field of Classification Search ................. 370/347, 370/280, 282, 286; 455/42, 86, 108
   See application file for complete search history.

(56) References Cited

U.S. PATENT DOCUMENTS

| 6,020,799 | A  | * | 2/2000 | Ishizaki et al. ............... 333/204 |
| 6,223,018 | B1 | * | 4/2001 | Fukumoto et al. .......... 455/41.1 |
| 6,754,472 | B1 |   | 6/2004 | Williams et al. |
| 6,912,612 | B2 | * | 6/2005 | Kapur et al. ................. 710/309 |
| 2001/0006509 | A1 | * | 7/2001 | Nguyen et al. ............... 370/281 |

FOREIGN PATENT DOCUMENTS

| JP | 07-170215   | 7/1995  |
| JP | 2001-298425 | 10/2001 |
| JP | 2003-143086 | 5/2003  |

* cited by examiner

*Primary Examiner*—Temica M Beamer
(74) *Attorney, Agent, or Firm*—Lowe Hauptman Ham & Berner, LLP

(57) ABSTRACT

Provided is communication apparatus and method using a transmission medium, in an environment where at least one transmitter and at least one receiver are connected to at least one human body which is a conductive transmission medium, in which the receiver requiring any information data requests a transmission to the transmitter or the transmitter sends a signal indicative of a transmission of required information data, and then, the transmitter provides the required information data to the receiver requiring the corresponding information data, thereby providing a communication environment without interference between the transmission means and the receiving means.

18 Claims, 11 Drawing Sheets

COMMUNICATION APPARATUS USING A TRANSMISSION MEDIUM AND METHOD FOR THE SAME

CROSS-REFERENCE TO RELATED APPLICATION

This application claims priority to and the benefit of Korean Patent Application No. 2004-79761, filed Oct. 7, 2004, the disclosure of which is incorporated herein by reference in its entirety.

BACKGROUND

1. Field of the Invention

The present invention relates to an apparatus and method for communication using a transmission medium and, more specifically, to an apparatus and method for communication using a transmission medium, communication apparatus and method using a transmission medium, in an environment where at least one transmitter and at least one receiver are connected to at least one human body which is a conductive transmission medium, in which the receiver requiring any information data requests a transmission to the transmitter or the transmitter sends a signal indicative of a transmission of required information data, and then, the transmitter provides the required information data to the receiver requiring the corresponding information data.

2. Discussion of Related Art

In general, various communication apparatuses such as PDAs, cellular phones, and medical appliances are needed in a private area in modern life. As a method of transmitting a data signal between a transmitter and a receiver located around the human body, there are a wired transmission using a cable and a wireless transmission using light and radio wave. The wired transmission is favorable in terms of security and transmission rate, but unfortunately, it is not portable and inconvenient to use.

In addition, the wireless transmission does not demand burdensome jobs such as cable connection. However, it needs an additional circuit for wireless transmission, and thus, it is difficult to provide at low costs.

To solve the problems, recently, a communication apparatus using a human body as a transmission medium has been proposed. In other words, the communication apparatus using the human body as a transmission medium can provide a communication environment where the additional circuit or the cable connection is required for wireless transmission in a manner that the communication apparatus transmits any information data to a transmission electrode connected to the human body that acts as a transmission path, and information data transmitted through the human body is received at the receiver via a receiving electrode connected to the human body.

The conventional communication apparatus using the human body as a transmission medium described above is limited to one-to-one communication between the transmitter and the receiver. In addition, when a plurality of transmitters and a plurality of receivers communicate with each other around the human body, signals transmitted and received through the human body may be collided so that malfunction of the apparatus may be induced.

SUMMARY OF THE INVENTION

The present invention is directed to an apparatus and method for communication using a transmission medium, in an environment where at least one transmitter and at least one receiver are connected to at least one human body which is a conductive transmission medium, in which the receiver requiring any information data requests a transmission to the transmitter, and then, the transmitter provides the required information data to the receiver requiring the corresponding information data.

The present invention is also directed to communication method using a transmission medium, in an environment where at least one transmitter and at least one receiver are connected to at least one human body, or a conductive transmission medium, in which the transmitter sends a signal indicative of a transmission of required information data, and then, the transmitter provides the required information data to the receiver requiring the corresponding information data.

One aspect of the present invention is to provide a communication apparatus and method using a transmission medium, comprising: at least one conductive transmission medium; at least one receiving means for generating a predetermined transmission request signal for requesting required information data to transmit the transmission request signal to the transmission medium; and at least one transmission means for receiving the transmission request signal transmitted through the transmission medium to transmit the required information data to the receiving means.

Another aspect of the present invention is to provide a communication apparatus using a transmission medium, comprising: at least one conductive transmission medium; at least one transmission means for generating a predetermined transmission notice signal for informing whether reception is available to transmit required information data and transmitting the transmission notice signal to the transmission medium; and at least one receiving means for receiving the transmission notice signal transmitted through the transmission medium to transmit a predetermined receive ready signal when reception is available, wherein the transmission means receives the receive ready signal transmitted through the transmission medium to transmit the required information data to the corresponding receiving means.

Another aspect of the present invention is to provide a communication method using a conductive transmission medium between at least one transmission means and at least one receiving means, comprising: (a) in the receiving means, generating a predetermined transmission request signal for requesting a transmission of required information data to transmit the transmission request signal to the transmission medium; and (b) in the transmission means, receiving the transmission request signal transmitted through the transmission medium to transmit the required information data to the receiving means.

Another aspect of the present invention is to provide a communication method using a conductive transmission medium between at least one transmission means and at least one receiving means, comprising: (a') in the transmission means, generating a predetermined transmission notice signal to transmit required information data required to transmit the transmission notice signal to the transmission medium, wherein the transmission notice signal informs whether reception is available; (b') in the receiving means, receiving the transmission notice signal transmitted through the transmission medium to transmit a predetermined receive ready signal to the transmission means when reception is available; and (c') in the transmission means, receiving the receive ready signal transmitted through the transmission medium to transmit the required information data to the receiving means.

Here, the transmission medium is preferably a human body.

BRIEF DESCRIPTION OF THE DRAWINGS

The above and other features and advantages of the present invention will become more apparent to those of ordinary skill in the art by describing in detail preferred embodiments thereof with reference to the attached drawings in which.

DETAILED DESCRIPTION OF PREFERRED EMBODIMENTS

Embodiments of the present invention will now be described in detail with reference to the attached drawings. However, the present invention is not limited to the following embodiments, but a variety of modification can be made. The embodiment of the present invention will be provided to give a thorough and complete understating to those skilled in the art.

First Embodiment

Figure 1:
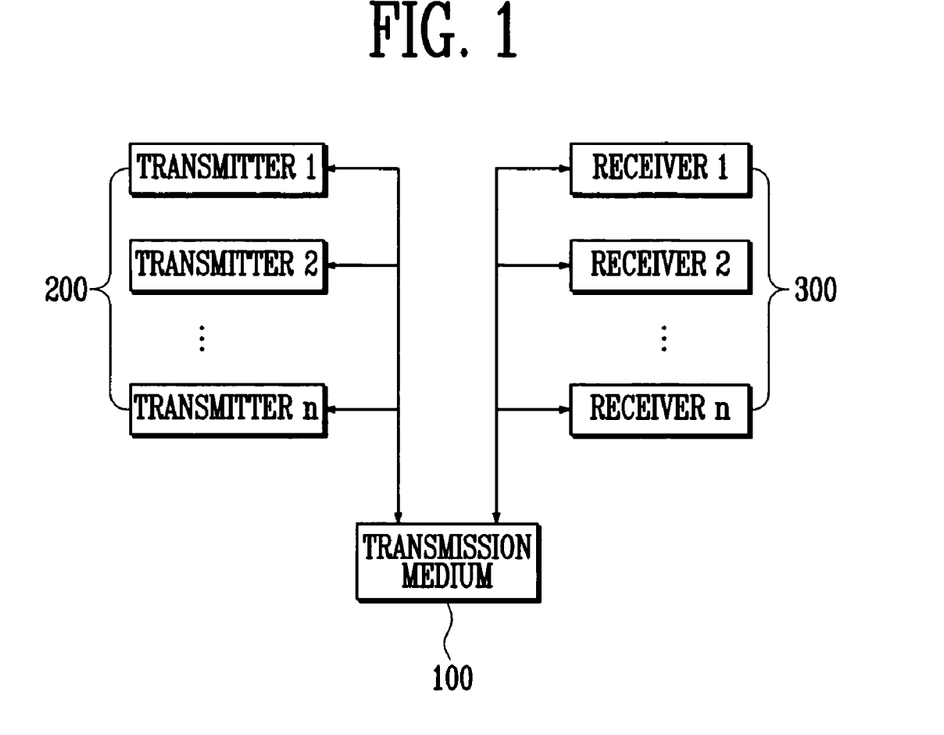
FIG. 1 is an overall block diagram for illustrating a communication apparatus using a transmission medium according to the first embodiment of the present invention.

FIG. 1 is an overall block diagram for illustrating a communication apparatus using a transmission medium according to the first embodiment of the present invention.

Referring to FIG. 1, in the communication apparatus using a transmission medium according to the first embodiment of the present invention, at least one transmitter 200 and at least one receiver 300 are physically connected with each other through at least one transmission medium.

Here, the transmission medium 100 is made of a dielectric that becomes conductive at a predetermined frequency, and is preferably a human body as a dielectric.

The transmitter 200 receives a transmission request signal transmitted from the receiver 300 through the transmission medium 100 to transmit required information data back to the receiver 300.

The transmitter 200 preferably comprises an oscillation unit (not shown) for generating a predetermined AC signal and a modulation unit (not shown) for modulating the AC signal based on the transmitted information data.

Further, the signal output from the transmitter 200 is modulated using any one of amplitude shift keying (ASK), frequency shift keying (FSK), and phase shift keying (PSK).

The receiver 300 generates a predetermined transmission request signal for requesting the transmission of the required information data to transmit the transmission request signal to the transmission medium 100.

The receiver 300 preferably comprises an oscillation unit (not shown) for generating a predetermined AC signal and a demodulation unit (not shown) for demodulating the AC signal based on the received information data.

When the communication apparatus using the transmission medium implemented as described above is located around a human body, which is the transmission medium 100, various duplexing schemes described below can be used to block interference between the transmission and receiving signals.

Figure 2:
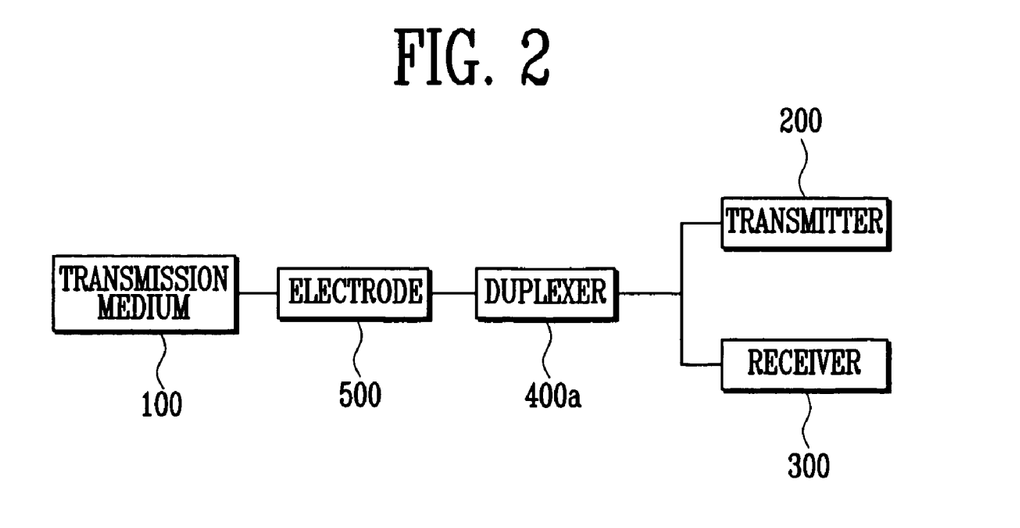
FIG. 2 is a schematic block diagram for illustrating a frequency division duplexing (FDD) adapted to a communication apparatus using a transmission medium according to the first embodiment of the present invention.

FIG. 2 is a schematic block diagram for illustrating a frequency division duplexing (FDD) adapted to a communication apparatus using a transmission medium according to the first embodiment of the present invention.

Referring to FIG. 2, first, for the frequency division duplexing (FDD), different frequencies are used so that the transmission frequency and the receiving frequency are separated. The transmission signals allowed to be input to the receiver 300 may be attenuated using a band pass filter, i.e., a duplexer 400a on the side of the receiver 300.

This type of duplexing uses the respective electrodes for the transmission and reception, in which the same electrode 500 is preferably used for the transmission and reception to achieve miniaturization of the apparatus. Here, the receiving frequency input through the electrode 500 by the duplexer 400a is transmitted to the receiver 300, and the transmission frequency output from the transmitter 200 is transmitted to the electrode 500. In other words, a separation degree required for a sufficient attenuation between the transmission and reception frequency bands can be obtained.

The communication apparatus using the frequency division duplexing (FDD) comprising a transmitter 200, a receiver 300, and a duplexer 400a is connected to the predetermined electrode 500, and the electrode 500 is connected to the human body, which is the transmission medium 100.

When the reception signal is input through the electrode 500, the reception signal is transmitted to the receiver 300 through the duplexer 400a, and when the predetermined information data transmitted from the transmitter 200 is output, the transmission signal is transmitted to the human body, or the transmission medium 100, through the duplexer 400a and the electrode 500.

Figure 3:
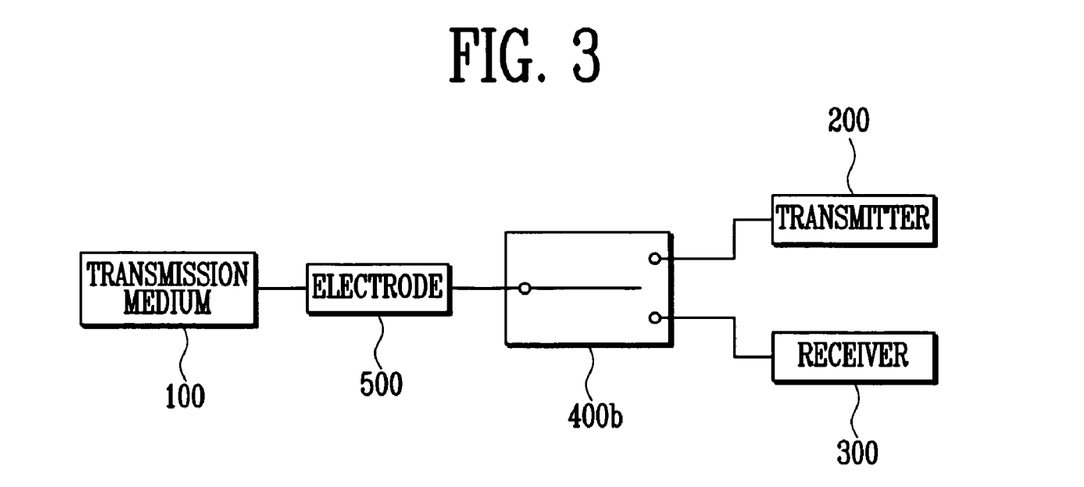
FIG. 3 is a schematic block diagram for illustrating a time division duplexing (TDD) adapted to a communication apparatus using a transmission medium according to the first embodiment of the present invention.

FIG. 3 is a schematic block diagram for illustrating a time division duplexing (TDD) adapted to a communication apparatus using a transmission medium according to the first embodiment of the present invention.

Referring to FIG. 3, for the time division duplexing (TDD), the transmission and reception signals are separated using the transmit/receive switch (T/R switch) 400b.

The T/R switch 400b operates at a high speed such that one electrode 500 is separated from the transmitter 200 and the receiver 300, and connected at a proper time. In general, the T/R switch 400b has a good isolation characteristic when it is OFF, so that it can protect the receiver 300 from the transmission signal having large signal amplitude.

In other words, the communication apparatus using the time division duplexing (TDD) comprising the transmitter 200, the receiver 300, and the T/R switch 400b is connected to the electrode 500, and the electrode 500 is connected to the human body which is the transmission medium 100.

When the receive signal is input through the electrode 500, the T/R switch 400b transmits the receive signal to the receiver 300, and when the predetermined information data that is an transmission signal is output from the transmitter 200, the T/R switch 400b transmits the information data to the human body which is the transmission medium 100, through the electrode 500.

FIGS. 4A to 4D are state diagrams for illustrating states of the communication apparatus using a transmission medium according to the first embodiment of the present invention.

Figure 4A:
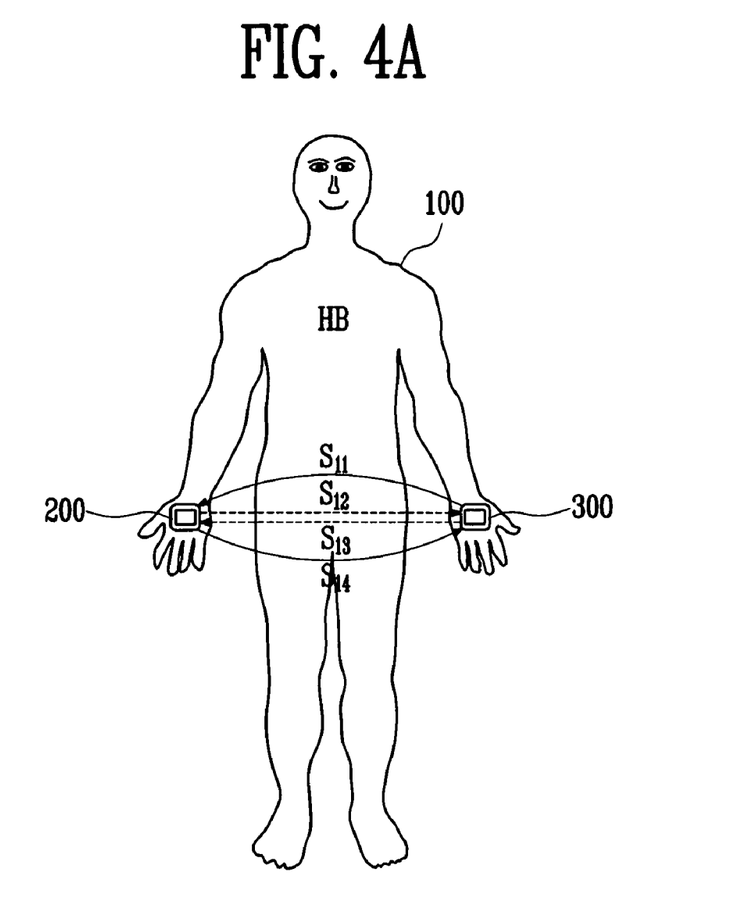
FIGS. 4A to 4D are state diagrams for illustrating states of the communication apparatus using a transmission medium according to the first embodiment of the present invention.

Referring to FIG. 4A, in a case where one transmitter 200 and one receiver 300 are connected to the human body (HB), which is transmission medium 100, when the receiver 300 attempts to receive any information data, the receiver 300 transmits a transmission request signal $S_{11}$ for requesting a transmission from the transmitter 200 to the human body (HB), which is the transmission medium 100, and the transmitter 200 receives the transmission request signal $S_{11}$ transmitted through the human body (HB) and transmits a receive wait signal $S_{12}$ indicative of a receive wait mode back to the human body (HB).

Next, the receiver 300 receives the receive wait signal $S_{12}$ transmitted through the human body (HB) and transmits a predetermined receive ready signal $S_{13}$, when reception is available, through the human body (HB) to the transmitter 200. Then, the transmitter 200 transmits information data $S_{14}$ required by the receiver 300, and the receiver 300 receives the information data $S_{14}$ transmitted through the human body (HB).

Further, the receive wait signal $S_{12}$ and the receive ready signal $S_{13}$ output from the transmitter 200 and the receiver 300, respectively, can be omitted.

Figure 4B:
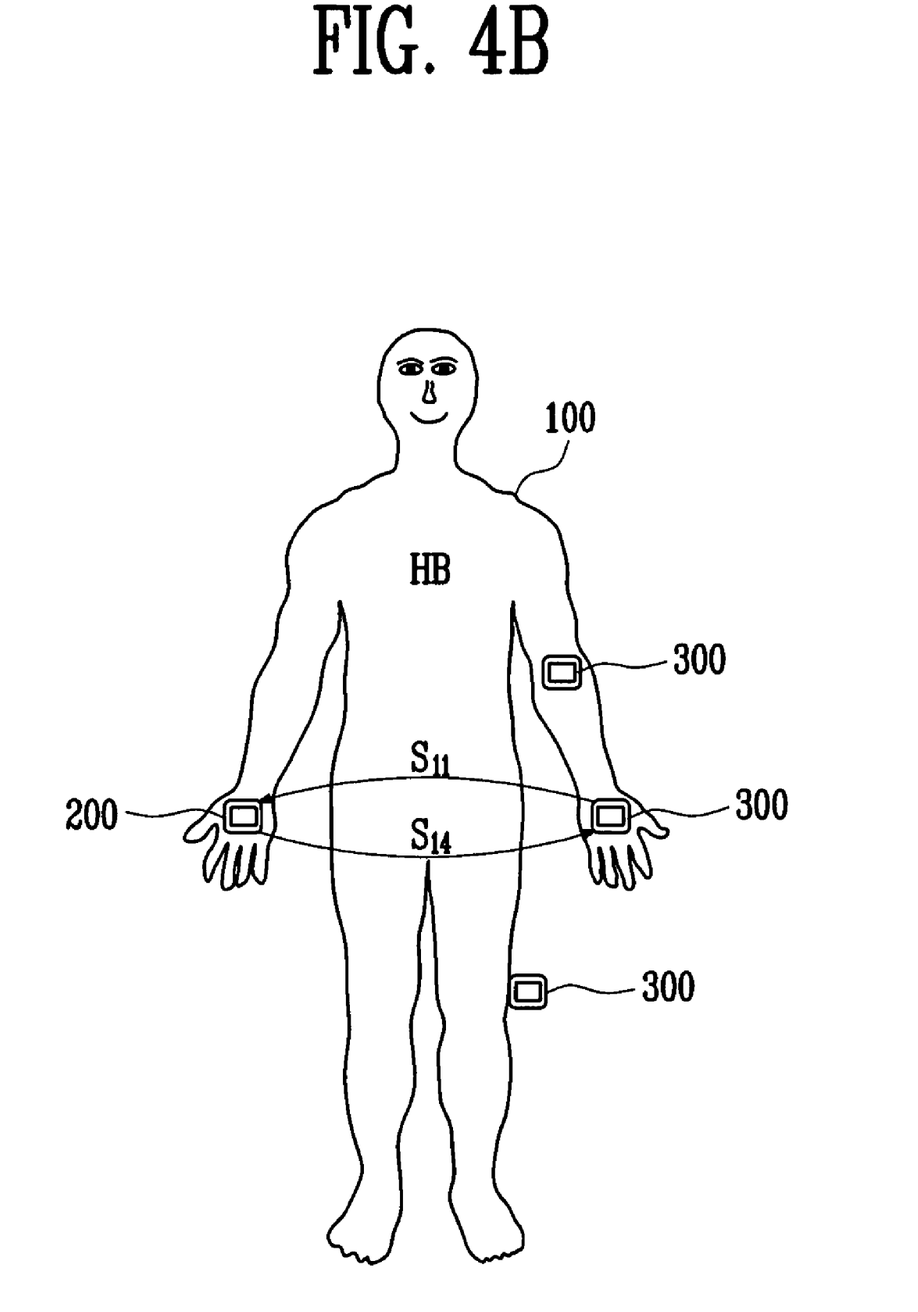

Referring to FIG. 4B, in a case where one transmitter 200 and a plurality of receivers 300 are connected to the human body (HB), which is the transmission medium 100, when there exists a receiver 300 that requests a reception of information data, among the plurality of receivers 300, the receiver 300 transmit the transmit request signal $S_{11}$ for requesting the transmission of the information data to the human body (HB), and the transmitter 200 receives the transmission request signal $S_{11}$ transmitted through the human body (HB) to transmit the information data $S_{14}$ to the human body (HB), and the receiver 300 receives the information data $S_{14}$ through the human body (HB).

Further, although the receive wait signal $S_{12}$ and the receive ready signal $S_{13}$ output from the transmitter 200 and the receiver 300 shown in FIG. 4A are omitted, the present invention is not limited hereto, but the receive wait signal $S_{12}$ and the receive ready signal $S_{13}$ can be added.

Figure 4C:
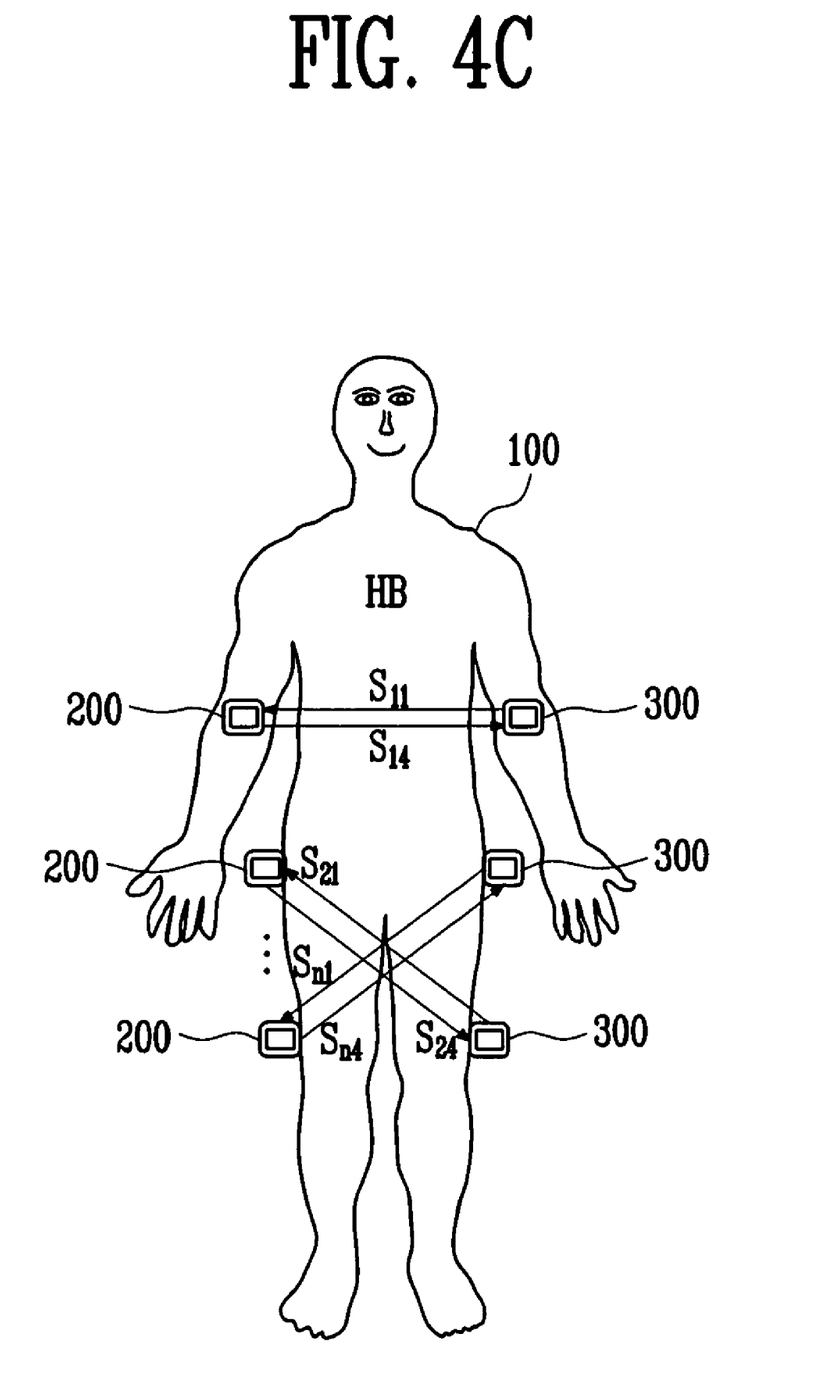

Referring to FIG. 4C, in a case where a plurality of transmitters 200 and a plurality of receivers 300 are connected to the human body (HB), or the transmission medium 100, when there exists a receiver 300 requiring information data among the plurality of receivers 300, the receiver 300 transmits transmission request signals $(S_{11})(S_{21})(S_{n1})$ for requesting the transmission of the information data to the human body (HB), and the transmitter 200 receives the transmission request signals $(S_{11})(S_{21})(S_{n1})$ transmitted through the human body (HB) to transmit the required information data $(S_{14})(S_{24})(S_{n4})$ to the human body (HB), and the receiver 300 receives the required information data $(S_{14})(S_{24})(S_{n4})$ transmitted through the human body (HB).

Further, although the receive wait signal $S_{12}$ and the receive ready signal $S_{13}$ output from the transmitter 200 and the receiver 300 shown in FIG. 4A are omitted, the present invention is not limited hereto but the receive wait signal $S_{12}$ and the receive ready signal $S_{13}$ can be inserted.

Figure 4D:
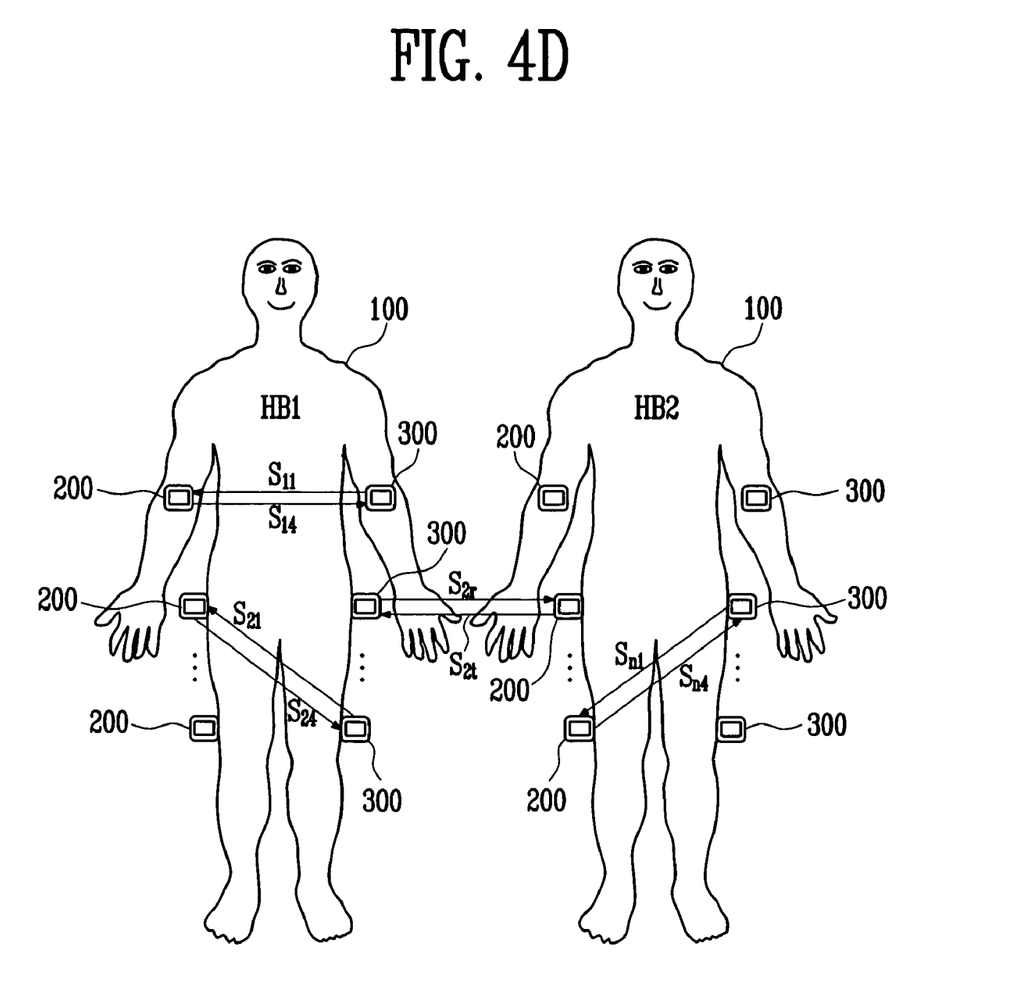

Referring to FIG. 4D, in a case where a plurality of transmitters 200 and a plurality of receivers 300 are connected to human bodies (HB1)(HB2), or a plurality of transmission media 100, when there exist receivers 300 requiring information data among the plurality of receivers 300, the receivers 300 transmit transmission request signals $(S_{11})(S_{2r})(S_{21})$ $(S_{n1})$ for requesting the transmission of the information data to the human bodies (HB1)(HB2), respectively, and the transmitters 200 receive the transmission request signals $(S_{11})$ $(S_{2r})(S_{21})(S_{n1})$ transmitted through the human bodies (HB1) (HB2) to transmit the required information data $(S_{14})(S_{2r})$ $(S_{24})(S_{n4})$ to the human bodies (HB1)(HB2), and the receivers 300 receive the required information data $(S_{14})(S_{2r})$ $(S_{24})(S_{n4})$ transmitted through the human bodies (HB1) (HB2).

Further, although the receive wait signal $S_{12}$ and the receive ready signal $S_{13}$ output from the transmitter 200 and the receiver 300 shown in FIG. 4A are omitted, the present invention is not limited hereto but the receive wait signal $S_{12}$ and the receive ready signal $S_{13}$ can be added.

Figure 5:
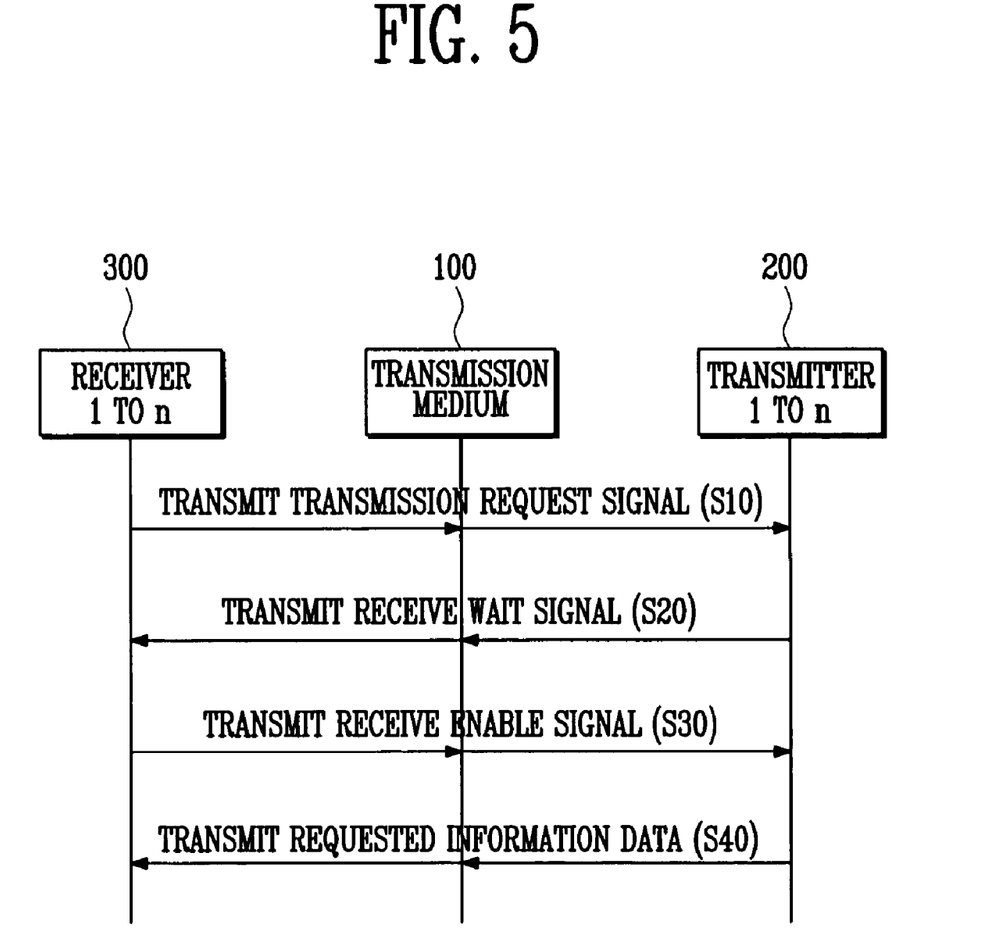
FIG. 5 is an overall flow chart for illustrating a communication method using a transmission medium according to the first embodiment of the present invention.

FIG. 5 is an overall flow chart for illustrating a communication method using a transmission medium according to the first embodiment of the present invention.

Referring to FIG. 5, first, in step S10, at least one receiver 300 generates a predetermined transmission request signal for requesting a transmission of required information data to transmit the transmission request signal to the transmission medium 100. Next, in step S20, at least one transmitter 200 receives the transmission request signal transmitted through the transmission medium 100 to transmit a predetermined receive wait signal indicative of a receive wait signal to the corresponding receiver 300.

Next, in step S30, the receiver 300 receives the receive wait signal through the transmission medium 100 to transmit a predetermined receive ready signal to the transmission medium 100, when reception is available. Then, in step S40, the transmitter 200 receives the receive ready signal transmitted through the transmission medium 100 to transmit the required information data to the corresponding receiver 300. Here, it is desirable that the transmitter 200 transmits the required information data to the receiver 300 that transmits the receive ready signal in the first place.

Further, when the receiver 300 transmits the predetermined transmission request signal to the transmitter 200, the specific transmitter 200 is preferably designated in advance, but the present invention is not limited hereto, and thus, the transmission request signal can be transmitted to any number of transmitters 200.

For example, when the receiver 300 designates the specific transmitter 200 to transmit the transmission request signal, preferably, the corresponding transmitter 200 transmits the receive wait signal requesting the receive wait mode to the receiver 300, and the other transmitters 200 block the transmission mode. However, when the receiver 300 does not designate the specific transmitter 200, preferably, the transmitter 200 that make a response in the first place among a plurality of transmitter 200 sends the receive wait signal for indicating the receive wait mode and the other transmitters 200 block the transmission mode.

In addition, before receiving the predetermined information data, the receiver 300 preferably performs an initialization operation using a typical pre-ample.

In addition, to increase a channel capacity of the communication system between the transmitter 200 and the receiver 300, any one of frequency division multiple access (FDMA), time division multiple access (TDMA), code division multiple access (CDMA), and orthogonal frequency division multiple (OFDM) can be selectively used or a combination thereof can be used.

FDMA refers to a method of dividing the typically allowed frequency band into several narrow frequency bands. In other words, a receive frequency band and a transmit frequency band are divided into a number of channels by the periodic bandwidth.

For the TDMA, voice and data are transmitted and received for a predetermined very short time at the allocated frequency band. In addition, the voice and data segments coming from other receivers are inserted. Therefore, the number of subscribers that can be accommodated into one channel can be increased up to several times. Typically, TDMA may accommodate many subscribers for each frequency band, in combination with FDD.

CDMA is a spread spectrum technology, spreading signals coming from the respective receivers over a relatively narrow band into the frequency using the specific spectrum code. Therefore, several hundreds of signals can be carried in the same frequency band, and then, recovered by the transmitter having the original spectrum code. Here, MC-CDMA, multi-carrier DS-CDMA, and MT-CDMA can be used according to the spectrum scheme.

OFDM converts data series input in serial into N data series in parallel to transmit the N data series over the sub-carrier in which orthogonality can be maintained with each other.

Second Embodiment

A communication apparatus using a transmission medium according to the second embodiment of the present invention is arranged in the same manner as described in the first embodiment. In other words, referring to FIG. 1, at least one transmitter 200 and at least one receiver 300 are physically connected through at least one transmission medium 100.

Here, the transmitter 200 adapted to the second embodiment of the present invention generates a predetermined transmission notice signal informing whether reception is available to transmit required information data to the transmission medium 100, and receives a receive ready signal transmitted from the receiver 300 through the transmission medium 100 to transmit the required information data to the corresponding receiver 300.

The receiver 300 adapted to the second embodiment of the present invention receives the transmission notice signal transmitted through the transmission medium 100 to transmit the receive ready signal, when reception is available, to the transmitter 200.

Further, like numbers refers to like elements throughout the first and second embodiments of the present invention, and thus, the detailed description of the second embodiment will be referred to that for the first embodiment (FIGS. 1 to 3)

Figure 6A:
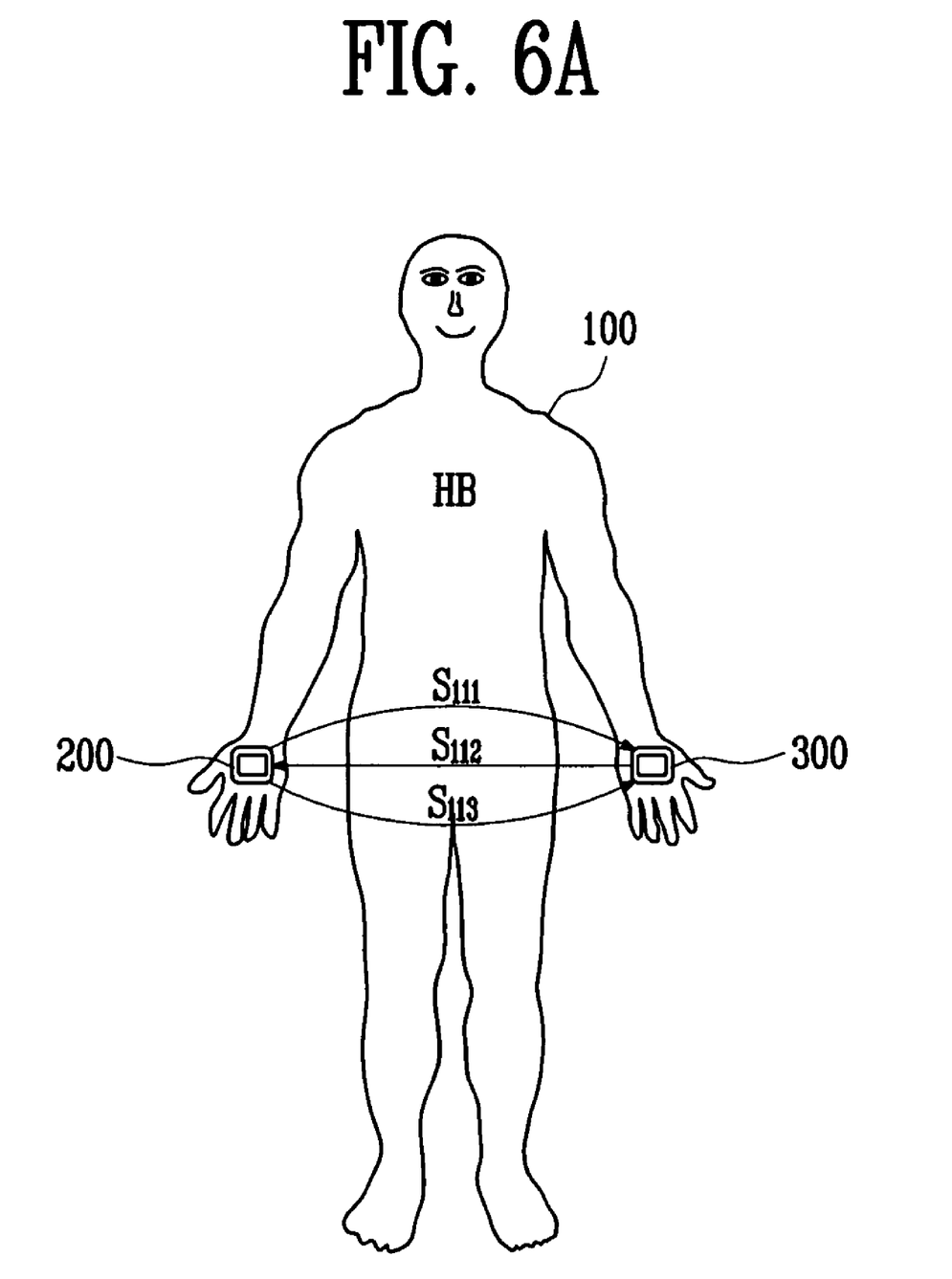
FIGS. 6A to 6D are state diagrams for illustrating states of the communication apparatus using a transmission medium according to the second embodiment of the present invention.

FIGS. 6A to 6D are state diagrams for illustrating states of the communication apparatus using a transmission medium according to the second embodiment of the present invention; and Referring to FIG. 6A, in a case where one transmitter 200 and one receiver 300 are connected to the human body (HB), or the transmission medium 100, the transmitter 200 generates a transmission notice signal $S_{111}$ informing whether reception is available for transmitting the required information data and transmits the transmission notice signal $S_{111}$ to the human body (HB), or the transmission medium 100, and the receiver 300 receives the transmission notice signal $S_{111}$ transmitted through the human body (HB) and transmits a receive ready signal $S_{112}$ back to the human body (HB) when reception is available.

Next, the transmitter 200 receives the receive ready signal S112 transmitted through the human body (HB), and transmits required information data $S_{113}$ to the corresponding receiver 300.

Figure 6B:
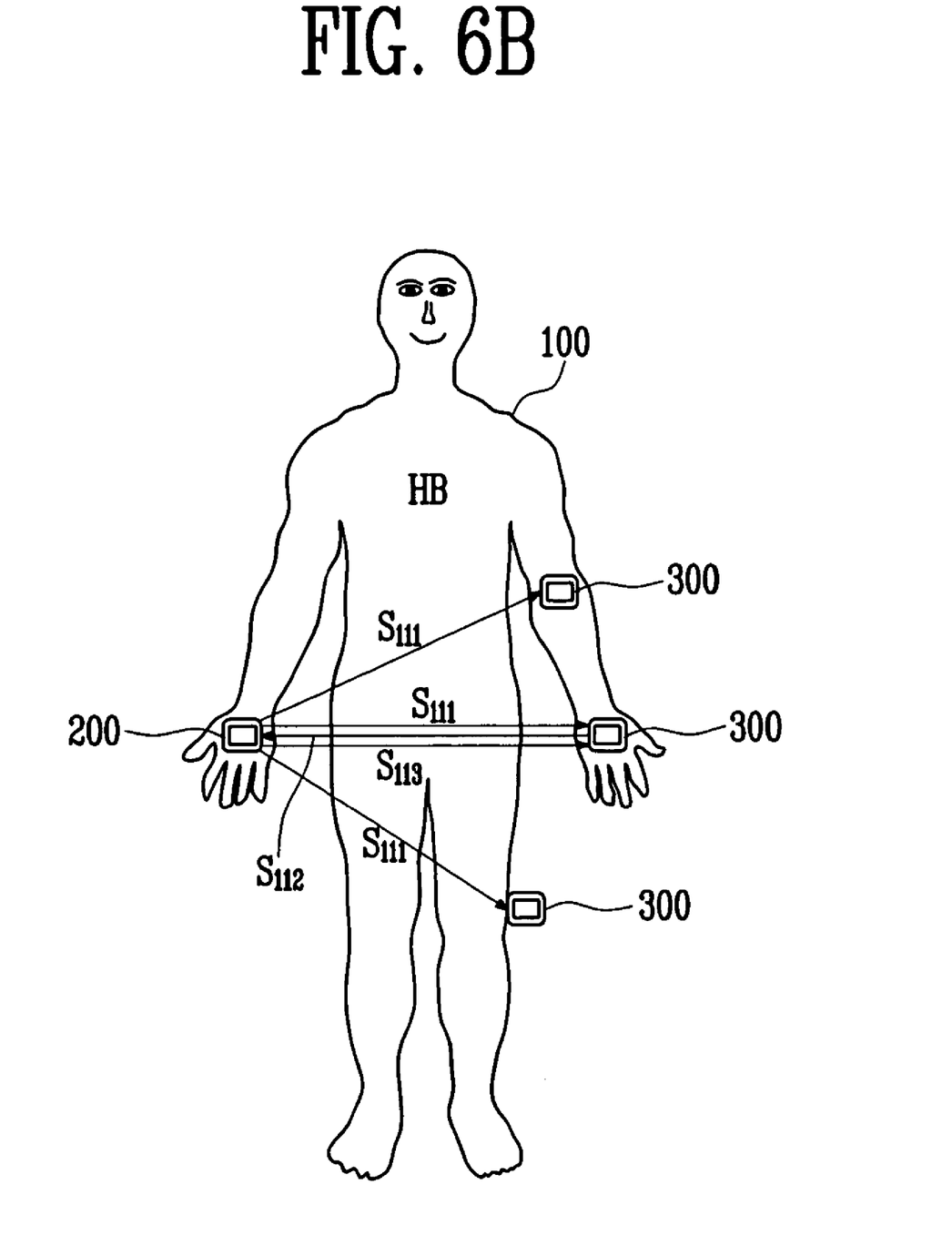

Referring to FIG. 6B, in a case where one transmitter 200 and a plurality of receivers 300 are connected to the human body (HB), or the transmission medium 100, the transmitter 200 generates the transmission notice signal $S_{111}$ informing whether reception is available for transmitting the information data requested by the plurality of receivers 300 and transmits the transmission notice signal $S_{111}$ to the human body (HB), or the transmission medium 100, and the receivers 300 receive the transmission notice signal $S_{111}$ transmitted through the human body (HB) and transmit the receive ready signal $S_{112}$ back to the human body (HB) when reception is available.

Next, the transmitter 200 receives the receive ready signal $S_{112}$ transmitted in the first place through the human body (HB), and transmits the required information data $S_{113}$ to the corresponding receiver 300.

Figure 6C:
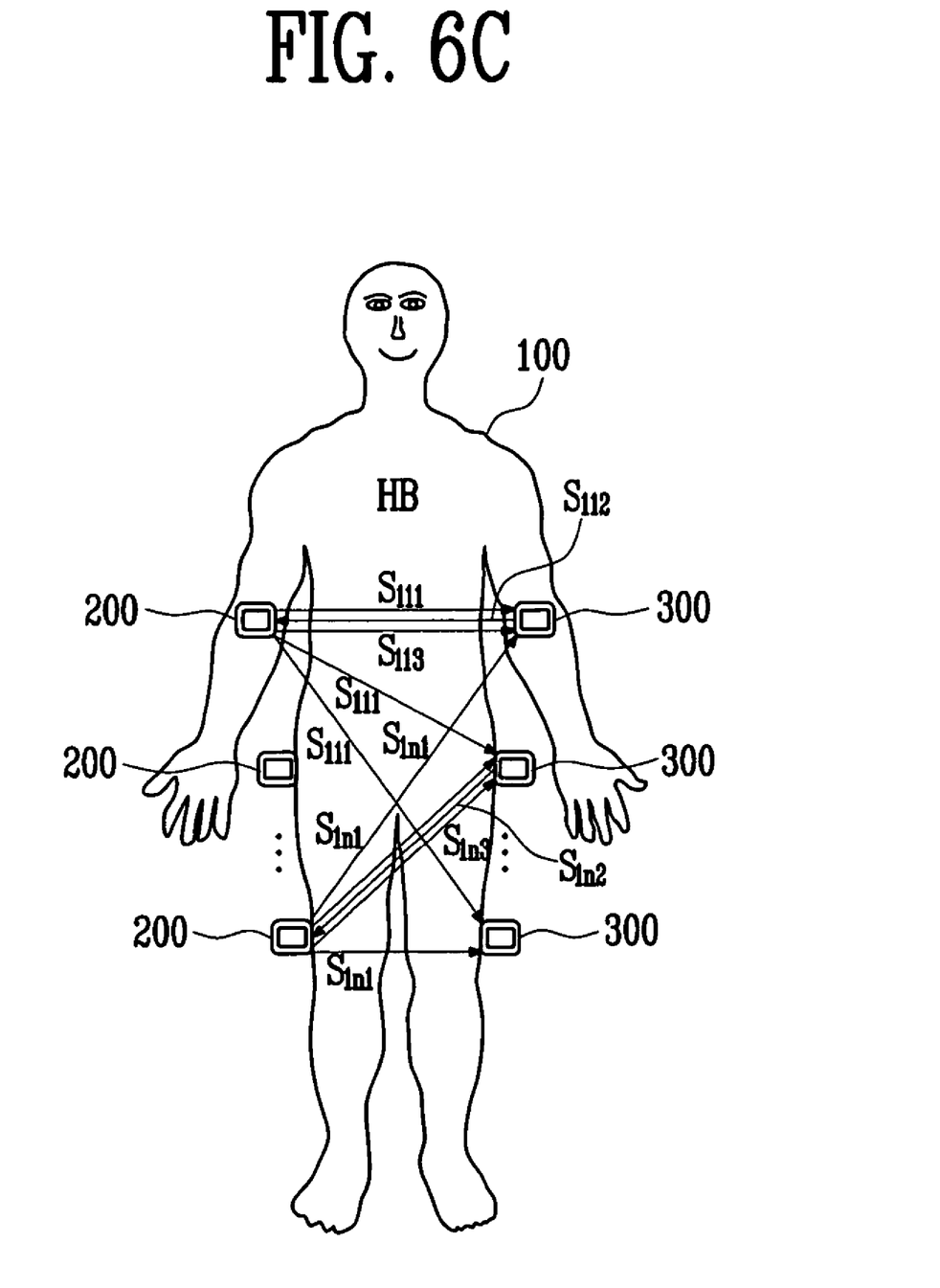

Referring to FIG. 6C, in a case where a plurality of transmitters 200 and a plurality of receivers 300 are connected to the human body (HB), or the transmission medium 100, the transmitters 200 generate the transmission notice signals $(S_{111})(S_{1n1})$ informing whether reception is available for transmitting the information data requested by the plurality of receivers 300 and transmit the transmission notice signal $S_{111}$ to the human body (HB) which is the transmission medium 100, and the receivers 300 receive the transmission notice signals $(S_{111})(S_{1n1})$ transmitted through the human body (HB) and transmit the receive ready signal $(S_{112})(S_{1n2})$ back to the human body (HB) when reception is available.

Next, the transmitter 200 receives the receive ready signal for example $S_{1n2}$ transmitted in the first place through the human body (HB), and transmits the required information data $S_{1n3}$ to the corresponding receiver 300.

Figure 6D:
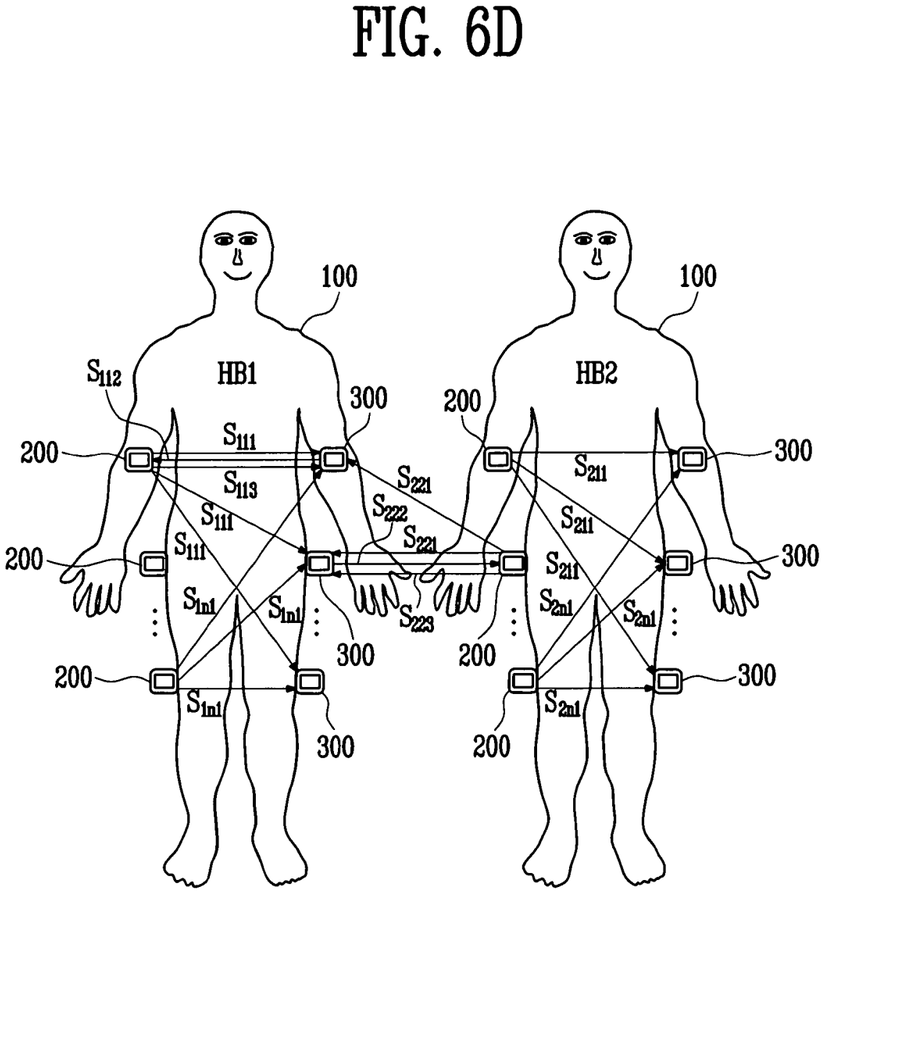

Referring to FIG. 6D, in a case where a plurality of transmitters 200 and a plurality of receivers 300 are connected to the human bodies (HB1)(HB2), or a plurality of transmission media 100, the transmitters 200 generate the transmission notice signals $(S_{111})(S_{1n1})(S_{211})(S_{221})(S_{2n1})$ informing whether reception is available for transmitting the information data requested by the plurality of receivers 300 and transmit the transmission notice signals to the human bodies (HB1)(HB2), or the transmission medium 100, and the receivers 300 receive the transmission notice signals $(S_{111})(S_{1n1})(S_{211})(S_{221})(S_{2n1})$ transmitted through the human bodies (HB1)(HB2) and transmit the receive ready signal $(S_{112})(S_{222})$ back to the human bodies (HB1)(HB2) when reception is available.

Next, the transmitter 200 receives the receive ready signal for example $S_{222}$ transmitted in the first place through the human bodies (HB1)(HB2), and transmits the required information data $S_{223}$ to the corresponding receiver 300.

Figure 7:
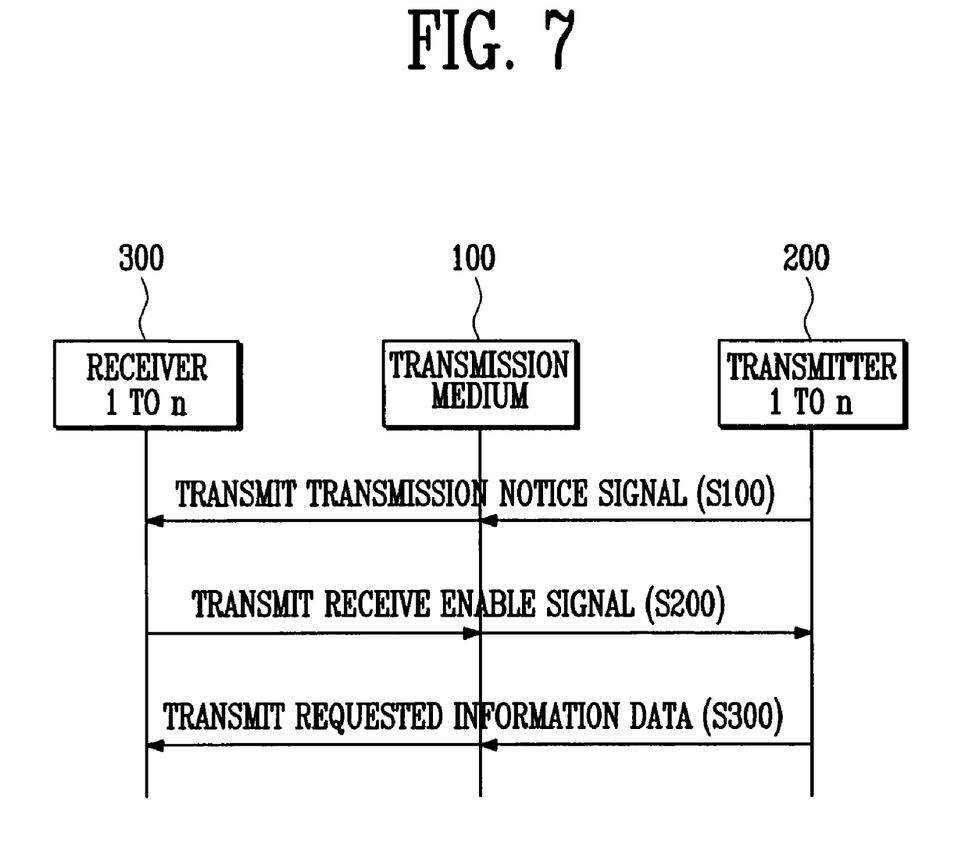
FIG. 7 is an overall flow chart for illustrating a communication method using a transmission medium according to the second embodiment of the present invention.

FIG. 7 is an overall flow chart for illustrating a communication method using a transmission medium according to the second embodiment of the present invention.

Referring to FIG. 7, first, in step S100, at least one transmitter 200 generates a predetermined transmission notice signal informing whether reception is available for transmitting the required information data and transmits the transmission notice signal to the transmission medium 100. Then, in step S200, at least one receiver 300 receives the transmission notice signal transmitted through the transmission medium 100 and transmits a predetermined receive ready signal to the transmitter 200 when reception is available.

Next, in step S300, the transmitter 200 receives the receive ready signal transmitted through the transmission medium 100, and transmits the required information data to the corresponding receiver 300. Here, the transmitter 200 preferably transmits the required information data to the receiver 300 that transmits the receive ready signal in the first place.

Further, although the transmitter 200 transmits the predetermined transmission notice signal to the receiver 300 to a number of receivers 300 in the second embodiment of the present invention, the present invention is not limited hereto, and a specific receiver 300 may be designated in advance.

In addition, before receiving the predetermined information data, the receiver 300 preferably perform an initialization operation using a typical pre-ample.

In addition, to increase a channel capacity of the communication system between the transmitter 200 and the receiver 300, any one of frequency division multiple access (FDMA), time division multiple access (TDMA), code division multiple access (CDMA), and orthogonal frequency division multiple (OFDM) can be selectively used or a combination thereof can be used. Therefore, the detailed description thereof will be referenced to the first embodiment.

For example, although the transmitter 200 and the receiver 300 are separated according to the communication apparatus of the embodiment of the present invention, the present invention is not limited hereto and the communication apparatus having the transmitter 200 in combination with the receiver 300 can be implemented.

As described above, according to communication method and apparatus using a transmission medium of the present invention, in an environment where at least one transmitter and at least one receiver are connected to at least one human body, or a conductive transmission medium, in which the receiver requiring any information data requests a transmission to the transmitter or the transmitter sends a signal indicative of a transmission of required information data, and then, the receiver transmits a response signal in the first place among a plurality of receivers requiring the information data to receive the required information data, thereby providing a communication environment without interference between the transmission means and the receiving means Although communication apparatus and method using a transmission medium according to the present invention have been described, the present invention is not limited hereto, and a variety of modification can be made within the scope of the appended claims, the detailed description and the accompanying drawings, which is included in the present invention.

What is claimed is:

1. A communication apparatus using a transmission medium, comprising:
    at least one conductive transmission medium;
    at least one receiving means configured to generate a transmission request signal for requesting required information data, the transmission request signal to be transmitted through the transmission medium;
    at least one transmission means configured to receive the transmission request signal and to transmit the required information data to the receiving means through the transmission medium;
    a switch connected to the transmission means and the receiving means to separate transmit signals output from the transmission means and receive signals input to the receiving means; the switch protecting the receiving means from the transmit signals having a large amplitude; and
    an electrode connected between the transmission medium and the switch to communicate the transmit/receive signals through the transmission medium;
    wherein time division duplexing (TDD) is used to prevent an interference between the transmit signals and the receive signals.

2. The communication apparatus according to claim 1, wherein the transmission medium is a human body.

3. The communication apparatus according to claim 1, wherein the transmission means comprises:
    an oscillation unit configured to generate a predetermined alternative-current signal; and
    a modulation unit configured to modulate the alternative-current signal based on the transmitted information data.

4. The communication apparatus according to claim 1, wherein the receiving means comprises:
    an oscillation unit configured to generate a predetermined alternative-current signal; and
    a demodulation unit configured to demodulate the alternative-current signal based on the received information data.

5. The communication apparatus according to claim 1, the signals output from the transmission means are modulated using any one of amplitude shift keying (ASK), frequency shift keying (FSK), and phase shift keying (PSK).

6. A communication apparatus using a transmission medium, comprising:
    at least one conductive transmission medium;
    at least one transmission means configured to generate a transmission notice signal for inquiring whether reception is ready, the transmission notice signal to be transmitted through the transmission medium;
    at least one receiving means configured to receive the transmission notice signal and to transmit a receive ready signal in response to the transmission notice signal, wherein the transmission means transmits information data to the receiving means that transmits the receive ready signal in the first place;
    a switch connected to the transmission means and the receiving means to separate transmit signals output from the transmission means and receive signals input to the receiving means, the switch protecting the receiving means from transmit signals having a large signal amplitude; and
    an electrode connected between the transmission medium and the switch to communicate the transmit/receive signals through the transmission medium;
    wherein time division duplexing (TDD) is used to prevent an interference between the transmit signals and the receive signals.

7. The communication apparatus according to claim 6, wherein the transmission medium is a human body.

8. The communication apparatus according to claim 6, wherein the transmission means comprises:
    an oscillation unit configured to generate a predetermined alternative-current signal; and
    a modulation unit configured to modulate the alternative-current signal based on the transmitted information data.

9. The communication apparatus according to claim 6, wherein the receiving means comprises:
    an oscillation unit configured to generate a predetermined alternative-current signal; and
    a demodulation unit configured to demodulate the alternative-current signal based on the received information data.

10. The communication apparatus according to claim 6, the signals output from the transmission means are modulated using any one of amplitude shift keying (ASK), frequency shift keying (FSK), and phase shift keying (PSK).

11. A communication method using a conductive transmission medium between at least one transmission means and at least one receiving means, comprising:

the receiving means transmitting a transmission request signal for requesting required information data through the transmission medium;

the transmission means receiving the transmission request signal and transmitting a receive wait signal through the transmission medium to the receiving means;

the transmission means transmitting the required information data to the receiver means that transmits the receive ready signal in the first place;

wherein transmit signals output from the transmission means and receive signals input to the receiving means are separated via a switch connected to the transmission means and the receiving means and communicated through the transmission medium via an electrode connected between the transmission medium and the switch.

12. The communication method according to claim 11, wherein, when the transmission means and the receiving means communicate with each other, specific transmission means and specific receiving means are designated in advance.

13. The communication method according to claim 11, wherein the receiving means performs initialization using a pre-ample before receiving the predetermined information data.

14. The communication method according to claim 11, wherein the transmission means and the receiving means selectively use any one of FDMA, TDMA, CDMA and OFDM or a combination thereof to increase a channel capacity while communicating with each other.

15. A communication method using a conductive transmission medium between at least one transmission means and at least one receiving means, comprising:

the transmission means generating a transmission notice signal and transmitting it through the transmission medium, wherein the transmission notice signal inquiries whether reception is available;

the receiving means receiving the transmission notice signal and transmitting a receive ready signal to the transmission means when reception is available; and the transmission means transmitting information data to the receiving means that transmits the receive ready signal in the first place;

wherein transmit signals output from the transmission means and receive signals input to the receiving means are separated via a switch connected to the transmission means and the receiving means and communicated through the transmission medium via an electrode connected between the transmission medium and the switch, the switch protecting the receiving means from the transmit signals having a large amplitude.

16. The communication method according to claim 15, wherein, when the transmission means and the receiving means communicate with each other, specific transmission means and specific receiving means are designated in advance.

17. The communication method according to claim 15, wherein the receiving means performs initialization using a pre-ample before receiving the predetermined information data.

18. The communication method according to claim 15, wherein the transmission means and the receiving means selectively use any one of FDMA, TDMA, CDMA and OFDM or a combination thereof to increase a channel capacity while communicating with each other.

* * * * *